United States Patent
Iwamasa et al.

(10) Patent No.: US 11,132,616 B2
(45) Date of Patent: Sep. 28, 2021

(54) CHARACTERISTIC VALUE ESTIMATION DEVICE AND CHARACTERISTIC VALUE ESTIMATION METHOD

(71) Applicant: KABUSHIKI KAISHA TOSHIBA, Tokyo (JP)

(72) Inventors: Mikito Iwamasa, Tokyo (JP); Takuro Moriyama, Kanagawa (JP); Tomoshi Otsuki, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 655 days.

(21) Appl. No.: 15/462,784

(22) Filed: Mar. 17, 2017

(65) Prior Publication Data
US 2018/0082204 A1   Mar. 22, 2018

(30) Foreign Application Priority Data

Sep. 20, 2016  (JP) ............................. JP2016-183408

(51) Int. Cl.
*G06N 7/00* (2006.01)
*G06N 20/00* (2019.01)
(Continued)

(52) U.S. Cl.
CPC ............ *G06N 7/005* (2013.01); *G06N 20/00* (2019.01); *G06N 20/10* (2019.01); *G05B 19/41885* (2013.01)

(58) Field of Classification Search
CPC ... G06N 7/005; G06N 20/00; G05B 19/41885
See application file for complete search history.

(56) References Cited

U.S. PATENT DOCUMENTS

| 6,678,640 B2 | 1/2004 | Ishida et al. |
| 7,499,842 B2 | 3/2009 | Grichnik et al. |

(Continued)

FOREIGN PATENT DOCUMENTS

| JP | 11-351049 | 12/1999 |
| JP | 2000-097422 | 4/2000 |

(Continued)

OTHER PUBLICATIONS

Ploennigs, Joern, et al. "Virtual sensors for estimation of energy consumption and thermal comfort in buildings with underfloor heating." Advanced Engineering Informatics 25.4 (2011): 688-698. (Year: 2011).*

(Continued)

*Primary Examiner* — Luis A Sitiriche
*Assistant Examiner* — Sehwan Kim
(74) *Attorney, Agent, or Firm* — Finnegan, Henderson, Farabow, Garrett & Dunner L.L.P.

(57) ABSTRACT

A characteristic value estimation device has a sensor data input unit to input sensor data detected by one or more sensors, a model input unit to input a first calculation model, a model learning unit to perform learning on a second calculation model, a model switch to select any one of the first calculation model and the second calculation model, a predictive value calculation unit to calculate an error of the calculation model, a probability distribution correction unit to correct the probability distribution of the uncertain parameter, a virtual sensor value estimation unit to estimate sensor data of a virtual sensor arranged virtually, a characteristic value distribution estimation unit to estimate a detailed distribution of the characteristic value, the sensor data of the virtual sensor, and the sensor data of the sensor, and a reliability calculation unit to calculate a reliability of the precise characteristic value distribution.

12 Claims, 9 Drawing Sheets

(51) Int. Cl.
  *G06N 20/10*   (2019.01)
  *G05B 19/418*   (2006.01)

(56) References Cited

U.S. PATENT DOCUMENTS

| | | | |
|---|---|---|---|
| 7,505,844 B2 | 3/2009 | Wiseman et al. | |
| 7,787,969 B2 | 8/2010 | Grichnik et al. | |
| 8,688,256 B2 | 4/2014 | Cheng et al. | |
| 2013/0124180 A1* | 5/2013 | Kim | G06F 30/20 |
| | | | 703/13 |
| 2014/0310228 A1 | 10/2014 | Nakabayashi et al. | |
| 2015/0371151 A1* | 12/2015 | Georgescu | G06N 20/00 |
| | | | 706/12 |
| 2016/0215606 A1* | 7/2016 | Okoroafor | G05B 15/02 |

FOREIGN PATENT DOCUMENTS

| | | | |
|---|---|---|---|
| JP | 3037908 | 5/2000 | |
| JP | 3790129 | 6/2006 | |
| JP | 2007-138921 | 6/2007 | |
| JP | 2008-107963 | 5/2008 | |
| JP | 2009-230209 | 10/2009 | |
| JP | 2010-0530179 | 9/2010 | |
| JP | 2010-530179 | 9/2010 | |
| JP | 2011-103036 | 5/2011 | |
| JP | 2007-138921 | 6/2011 | |
| JP | 4716684 | 7/2011 | |
| JP | 2012-33170 | 2/2012 | |
| JP | 5026433 | 9/2012 | |
| JP | 2013-2672 | 1/2013 | |
| JP | 5156210 | 3/2013 | |
| JP | 5437328 | 12/2013 | |
| JP | 5437328 | 3/2014 | |
| JP | 2014-206870 | 10/2014 | |
| JP | 2015-74835 | 4/2015 | |
| JP | 2015-074836 | 4/2015 | |
| WO | WO 2015-037295 | 3/2015 | |
| WO | WO 2015-037296 | 3/2015 | |
| WO | WO-2016053960 A1 * | 4/2016 | E06B 9/24 |

OTHER PUBLICATIONS

Shen, Xiaojing, et al. "Minimizing Euclidian state estimation error for linear uncertain dynamic systems based on multisensor and multi-algorithm fusion." IEEE Transactions on Information Theory 57.10 (2011): 7131-7146. (Year: 2011).*

Gunay, H. Burak, P. E. Ian Beausoleil-Morrison PhD, and Jayson Bursill. "Implementation of an adaptive occupancy and building learning temperature setback algorithm." Ashrae Transactions 122 (2016): 179. (Year: 2016).*

Bacher, Peder, and Henrik Madsen. "Identifying suitable models for the heat dynamics of buildings." Energy and Buildings 43.7 (2011): 1511-1522. (Year: 2011).*

Srivastava, Ashok N. "Greener aviation with virtual sensors: a case study." Data Mining and Knowledge Discovery 24.2 (2012): 443-471. (Year: 2012).*

Shen, Xiaojing, et al. "Minimizing Euclidian state estimation error for linear uncertain dynamic systems based on multisensor and multi-algorithm fusion." IEEE Transactions on Information Theory &nsbp;57.10 (2011): 7131-7146. (Year: 2011).*

Gunay, H. Burak, P. E. Ian Beausoleil-Morrison PhD, and Jayson Bursill. "Implementation of an adaptive occupancy and building learning temperature setback algorithm." Ashrae Transactions 122 (2016): 179. (Year: 2016).*

Ploennigs, Joern, et al. "Virtual sensors for estimation of energy consumption and thermal comfort in buildings with underfloor heating." Advanced Engineering Informatics 25.4 (2011): 688-698. (Year: 2011).*

Srivastava, Ashok N. "Greener aviation with virtual sensors: a case study." Data Mining and Knowledge Discovery 24.2 (2012): 443-471. (Year: 2012).*

Shen, Xiaojing, et al. "Minimizing Euclidian state estimation error for linear uncertain dynamic systems based on multisensor and multi-algorithm fusion." IEEE Transactions on Information Theory 57. 10 (2011): 7131-7146. (Year: 2011).*

Gunay, H. Burak, P. E. Ian Beausoleil-Morrison PhD, and Jayson Bursill. "Implementation of an adaptive occupancy and building learning temperature setback algorithm." Ashrae Transactions &npsb;122 (2016): 179. (Year: 2016).*

Bacher, Peder, and Henrik Madsen. "Identifying suitable models for the heat dynamics of buildings." Energy and Buildings 43.7 (2011): 1511-1522. (Year: 2011).*

C.M. Bishop, "Pattern Recognition and Machine Learning", Springer Science & Business Media LLC, pp. 1-749, (2006).

C.E. Rasmussen and C. K.I.Williams, "Gaussian Processes for Macine Learning." The MIT Press, 2006 ISBN 026218253X, Massachusetts, Institute of Technology. www.GaussianProcess.org/gpml., pp. 1-266 (2006).

* cited by examiner

EXAMPLE OF ONE-DIMENSIONAL SPACE

OBSERVATIONAL VALUE $X_{obs}$ = [-2.1, -1.5, 0.3, 1.8, 2.5]
$Y_{obs}$ = [ 0.11579398, 0.67447562, 0.58653244, -0.93075898, -1.33088595])

REGRESSION

PREDICTION
(WIDTH SHOWS DISPERSION $\Sigma$)

EXAMPLE OF TWO-DIMENSIONAL SPACE

OBSERVATIONAL VALUE

REGRESSION

ESTIMATION OF SPATIAL DISTRIBUTION

DISTRIBUTION OF DISPERSION

CHARACTERISTIC VALUE ESTIMATION DEVICE AND CHARACTERISTIC VALUE ESTIMATION METHOD

CROSS REFERENCE TO RELATED APPLICATIONS

This application is based upon and claims the benefit of priority from the prior Japanese Patent Application No. 2016-183408, filed on Sep. 20, 2016, the entire contents of which are incorporated herein by reference.

FIELD

Embodiments of the present invention relates to a characteristic value estimation device and a characteristic value estimation method.

BACKGROUND

In conventional system monitoring techniques, uncertain parameters are identified by comparing simulation results and observational data, but it is impossible to provide the reliability of the identified parameters and information on the error of modeling itself. Further, in the conventional techniques obtaining response situations from a small amount of statistical sample data, the physics model of a target is ignored, and thus it is impossible to provide information on the reliability of estimation results including a gap from the physics model.

DETAILED DESCRIPTION

According to one embodiment, a characteristic value estimation device has:
a sensor data input unit to input sensor data detected by one or more sensors monitoring a characteristic value;
a model input unit to input a first calculation model which calculates the characteristic value;
a model learning unit to perform learning on a second calculation model which calculates the characteristic value, based on the sensor data;
a model switch to select any one of the first calculation model and the second calculation model;
a predictive value calculation unit to calculate an error of the calculation model by comparing a value obtained by executing a simulation which calculates the characteristic value with the sensor data of the sensor, based on the calculation model selected by the model switch, a probability distribution of an uncertain parameter in a plurality of parameters included in the calculation model, and the sensor data of the sensor;
a probability distribution correction unit to correct the probability distribution of the uncertain parameter until the error has a predetermined value or less;
a virtual sensor value estimation unit to estimate sensor data of a virtual sensor arranged virtually at a location where the sensor is not arranged, based on the error;
a characteristic value distribution estimation unit to estimate a detailed distribution of the characteristic value at the location where the sensor is not arranged, based on the error, the sensor data of the virtual sensor, and the sensor data of the sensor; and
a reliability calculation unit to calculate a reliability of the precise characteristic value distribution estimated by the characteristic value distribution estimation unit.

Hereinafter, embodiments of the present invention will be explained referring to the drawings.

First Embodiment

Figure 1:
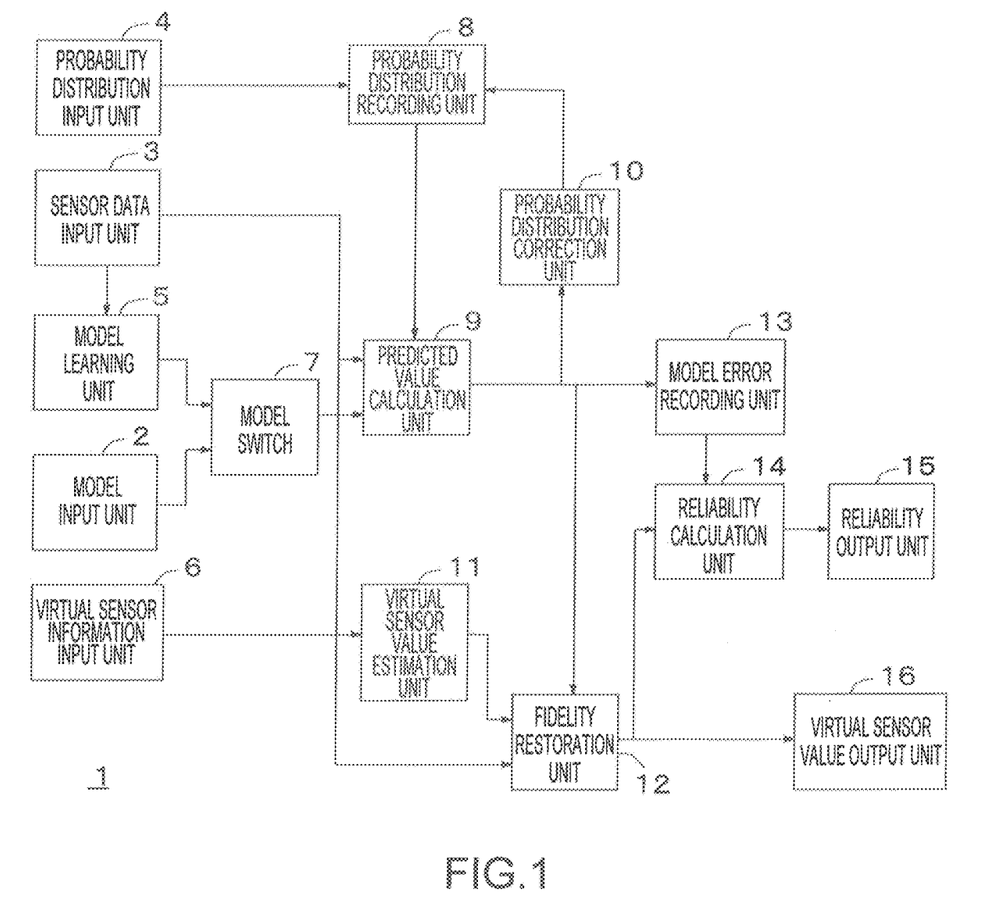
FIG. 1 is a block diagram showing a schematic structure of a characteristic value estimation device according to a first embodiment.

FIG. 1 is a block diagram showing a schematic structure of the characteristic value estimation device 1 according to a first embodiment. The characteristic value estimation device 1 of FIG. 1 has a model input unit 2, a sensor data input unit 3, a probability distribution input unit 4, a model learning unit 5, a virtual sensor information input unit 6, a model switch 7, a probability distribution recording unit 8, a predictive value calculation unit 9, a probability distribution correction unit 10, a virtual sensor value estimation unit 11, a fidelity restoration unit (characteristic value distribution estimation unit) 12, a model error recording unit 13, a reliability calculation unit 14, a reliability output unit 15, and a virtual sensor value output unit 16.

The model input unit 2 is provided to input a first calculation model for calculating a characteristic value. More concretely, the model input unit 2 is inputted with a calculation model simulating the behavior of a target plant or process. The calculation model is generated outside or inside the characteristic value estimation device 1 of FIG. 1, and inputted into the model input unit 2. Here, the model is a description of a system simulating the behavior of a target plant or machine, and a certain output is obtained when interpreting the model using a dedicated simulator.

The sensor data input unit 3 is provided to input sensor data detected by one or more sensors monitoring a characteristic value. As a more concrete example, the sensor data input unit 3 is inputted with sensor data about a process. The function, type, and number of the sensors are not particularly questioned. The sensor is a temperature sensor for example.

The probability distribution input unit 4 is provided to input a prior probability distribution of an uncertain parameter which is included in parameters used in the calculation model but has no sensor data corresponding thereto. The prior probability distribution inputted into the probability distribution input unit 4 is recorded in the probability distribution recording unit 8. A concrete example of the uncertain parameter will be mentioned later.

The model learning unit 5 performs learning on a second calculation model for calculating the characteristic value, based on the sensor data. More specifically, the model learning unit 5 learns the behavior of a target process from the sensor data. It is possible to utilize a technique of obtaining response situations of the system from data. For example, utilizing a Gaussian process makes it possible to estimate, from data, a probability distribution of a function generating this data. In this way, the model learning unit 5 creates a calculation model learning response situations from the sensor data.

The model switch 7 selects any one of the first calculation model and the second calculation model. Further, when the granularity for dividing a space can be adjusted, the model switch 7 selects a calculation model dividing the space with an appropriate granularity.

More specifically, the model switch 7 switches between the calculation model inputted from the model input unit 2 (first calculation model) and a model obtained by the model learning unit learning response situations from the sensor data (second calculation model), and transmits the selected calculation model to the predictive value calculation unit 9. For example, when prediction using a model has a significant gap from observational data and validity of the model itself is doubtful, the prediction is switched to use the learned model. When clear parts and unclear parts coexist in the model for the whole system, the calculation of the predictive value can be performed by switching between the calculation model and the learning model.

Further, when the granularity of the calculation model can be adjusted, the model switch 7 has a function of switching the granularity.

In the present embodiment, the overall room temperature is calculated regarding a room as one spot, as mentioned later. However, it is also possible in modeling to divide a space finely to estimate the room temperature in each divided space.

Dividing the space increases computational complexity and requires to prepare observational data on each divided space, which leads to the increase in cost. On the other hand, reducing the number of divisions makes it impossible to predict a small variation in the spatial direction. The model switch 7 analyzes the trade-off relationship and selects a model having an appropriate granularity.

The virtual sensor information input unit 6 is provided to input and record information specifying the installation location of a virtual sensor and the state quantity of the process to be sensed.

The predictive value calculation unit 9 calculates an error of the calculation model by comparing a value obtained by executing a simulation for calculating the characteristic value with the sensor data of the sensor, based on the calculation model selected by the model switch 7, a probability distribution of an uncertain parameter in a plurality of parameters included in the calculation model, and the sensor data of the sensor. The predictive value calculation unit 9 repeatedly performs correction and simulation on the above probability distribution to make the error as small as possible. If the error is large, simulation is repeated while correcting the probability distribution of the uncertain parameter.

More concretely, the predictive value calculation unit 9 executes simulation using the calculation model selected by the model switch 7 based on the sensor data and the probability distribution of the uncertain parameter, and outputs a result of the simulation.

The probability distribution correction unit 10 corrects the probability distribution of the uncertain parameter until the error calculated by the predictive value calculation unit 9 has a predetermined value or less. The corrected probability distribution is recorded in the probability distribution correction unit 10.

The virtual sensor value estimation unit 11 estimates sensor data of a virtual sensor arranged virtually at a location where the sensor is not arranged, based on the error calculated by the predictive value calculation unit 9. The virtual sensor value estimation unit 11 acquires the sensor data of the virtual sensor from the simulation data of the predictive value calculation unit 9.

The fidelity restoration unit 12 estimates a detailed distribution of the characteristic value at the location where the sensor is not arranged, based on the error calculated by the predictive value calculation unit 9, the sensor data of the virtual sensor, and the sensor data of the sensor. Thus, the fidelity restoration unit 12 corresponds to a characteristic value distribution estimation unit. In the present embodiment, the detailed distribution of the characteristic value estimated by the fidelity restoration unit 12 is called fidelity restoration. More concretely, the fidelity restoration unit 12 interpolates discretely-arranged sensor data of the sensor to estimate in detail the sensor data of the virtual sensor arranged at the location where the sensor is not arranged.

When the fidelity of the predictive value obtained by the predictive value calculation unit 9 is lower than the fidelity of an observation spot (sensor position), the fidelity restoration unit 12 restores the fidelity of the predictive value to the fidelity of the observation spot. In the present embodiment, the fidelity concerns estimation of the temperature distribution in an office. It is often that thermometers are installed at limited locations in the office at uneven intervals. In the present embodiment, the temperature distribution in the office is estimated based on the measurement values of such thermometers.

More concretely, the fidelity restoration unit 12 restores the fidelity in the space by averaging the results of predictive value calculation performed on a room basis and interpolating the temperature data obtained from actual observation spots to obtain a distribution. The fidelity can be restored by performing an interpolation process on discrete data. In the present embodiment, the fidelity restoration is performed using a probability process as typified by the Gaussian process.

Here, Gaussian process $GP(m, \Sigma)$ is defined by a median function m and a covariant matrix $\Sigma$ of the coordinate of the observation spot. A predictive value obtained by correcting the output of the model obtained by the predictive value calculation unit 9 with the modeling error is regarded as the median function. If space information at discrete observation spots is given to the median function as the covariant matrix Σ, a spatiotemporal function for interpolating the observation spots can be estimated. In the estimation of the present embodiment, the estimated predictive temperature in the entire room is regarded as the median function, and the estimation is performed by interpolating observation data of the sensors arranged discretely in the space based on the spatial distribution.

The model error recording unit 13 records the error calculated by the predictive value calculation unit 9 as an error of the calculation model itself.

The reliability calculation unit 14 calculates a reliability of the characteristic value distribution estimated by the fidelity restoration unit 12. More concretely, the reliability calculation unit 14 calculates a reliability of the sensor data of a virtual sensor. In the present embodiment, three-dimensional distribution of the temperature is estimated by the Gaussian process regression. At this time, a reliability of an estimation value can be estimated in three-dimensional distribution. In the Gaussian process regression, dispersion $c - k^T C_N^{-1} k$ corresponds to the reliability.

The virtual sensor value output unit 16 outputs the sensor data of the virtual sensor, based on the characteristic value distribution estimated by the fidelity restoration unit 12.

Figure 2:
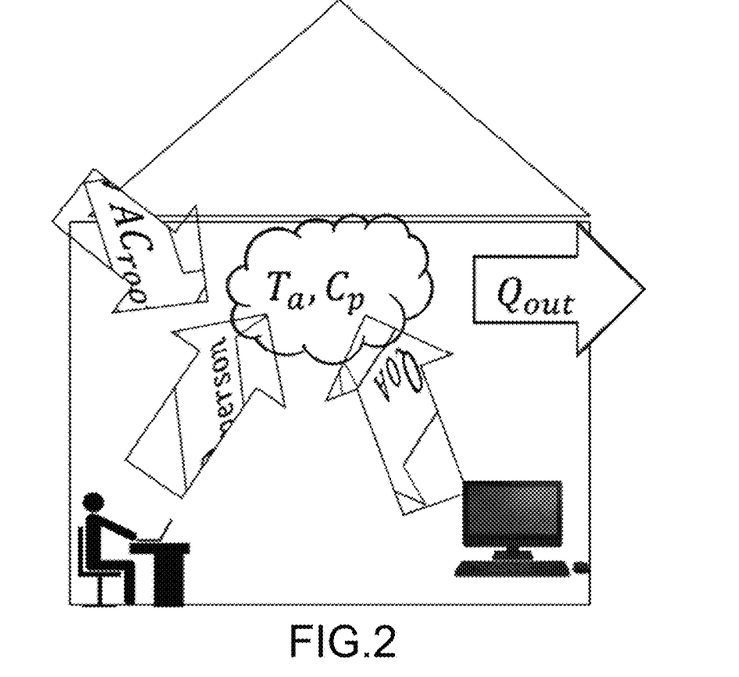
FIG. 2 is a diagram explaining an example of a calculation model used by the characteristic value estimation device of FIG. 1.

FIG. 2 is a diagram explaining an example of the calculation model used by the characteristic value estimation device 1 of FIG. 1. FIG. 2 shows an example of modeling a heat exchange process in an office. This is a model for calculating a temperature change in a certain room. The room is an enclosed space partitioned by walls. Further, the room exchanges heat with the outside through the walls, and an air-conditioning system makes heat flow in and out of the room. Further, heat generated by OA (Office Automation) equipments and people in the room flows in the room. Since the room has a heat capacity, the amount of heat flowing into the room is consequently reflected in the room temperature. For example, when the room temperature rises due to the amount of heat flowing into the room through an air adjustment unit (hereinafter referred to as an air conditioner), the temperature difference between the room and the outside becomes larger, by which a larger amount of heat flows to the outside through the walls and the room temperature drops.

In this way, inflow and outflow of heat with respect to the room are performed influences each other in accordance with the law of conservation of heat.

In FIG. 2, the balance of heat in the room is shown with arrows. HVACroom represents the amount of heat generated by an air conditioner. Qperson represents the amount of heat generated by each person in the room. QOA represents the amount of heat generated by OA equipments. Qout represents the amount of heat flowing to the outside of the room.

In FIG. 2, the heat Qout flowing out of the room through the walls between the inside and outside of the room, the heat HVACout flowing in and out of the room through the air conditioner, the heat QOA generated by the OA equipments in the room, and the heat Qperson generated by each person are summed up to calculate the balance of the amount of heat in the room. Further, a room temperature Ta is calculated from a heat capacity Cp of the room. Further, the heat balance changes when the outflow heat Qout is calculated again based on the difference between the room temperature Ta and an outdoor air temperature to. The amount of heat generated by all the people in the room can be expressed by Formula (1) shown below.

$$Q\text{person} = pnum(i) \times \text{PowerDenPerson} \qquad (1)$$

In Formula (1), the number of people in the room at a certain time i is defined as pnum(i), and a human heat rate is defined as PowerDenPerson. The amount of heat generated by all of the OA equipments in the room can be expressed by Formula (2) shown below.

$$Q\text{OA} = pnum(i) \times \text{PowerDenOA} \qquad (2)$$

In Formula (2), the number of OA equipments in the room at the certain time i is defined as pnum(i), and the amount of heat generated by each OA equipment is defined as PowerDenOA. The amount of heat Qout flowing out of the room can be expressed by Formula (3) shown below.

$$Q\text{out} = q \times (to(i) - Ta(i)) \qquad (3)$$

In Formula (3), Ta(i) represents a room temperature at the time i, and to(i) represents an outdoor air temperature at the time i. Further, q represents a thermal conductivity unique to the walls, which is a fixed value. The amount of heat HVACroom generated by the air conditioner can be expressed by Formula (4) shown below.

$$\text{HVACroom} = -\text{ControllerGain} \times (Ta - Tsc) \qquad (4)$$

ControllerGain represents a coefficient, Ta represents a room temperature, and Tsc represents a set temperature. The amount of heat HVACout flowing into the room through the air conditioner can be expressed by Formula (5) shown below.

$$\text{HVACout} = \text{HVACroom} \div \text{COP} \div \text{Compefficiency} \qquad (5)$$

In Formula (5), HVACroom represents an amount of heat generated by the air conditioner, and COP represents a heat efficiency. Power q(i) of the air conditioner at the time i can be expressed by Formula (6) shown below.

$$q(i) = \text{HVACout} \div 1000 \qquad (6)$$

The amount of heat Q in the entire room can be expressed by Formula (7) shown below. Here, dt is defined as a simulation time interval, and dT is defined as a change in the room temperature around the time interval dt.

$$Q = Q\text{person} + Q\text{OA} + \text{HVACroom} + Q\text{out} \qquad (7)$$

$$dT = Q \div Cp \times dt \qquad (8)$$

Room temperature Ta(i+1) at time (i+1) can be expressed by Formula (9) shown below.

$$Ta(i+1) = Ta(i) + dT \qquad (9)$$

The human heat rate PowerDenPerson in the above Formula (1) and the set temperature Tsc in above Formula (4) are uncertain parameters whose values cannot be specified previously. By executing simulation while setting a certain value to the uncertain parameter, the room temperature calculated by the simulation can be compared to an observational value (measurement value) of the room temperature.

The error between the simulation-based room temperature and the observational value changes when the uncertain parameter is variously changed. Accordingly, variously correcting the value of the uncertain parameter makes it possible to adjust the values of a human heat rate pdp (=PowerDenPerson) and the set temperature Tsc so that the calculation result of the room temperature and the observational value of the room temperature match each other.

Figure 3:
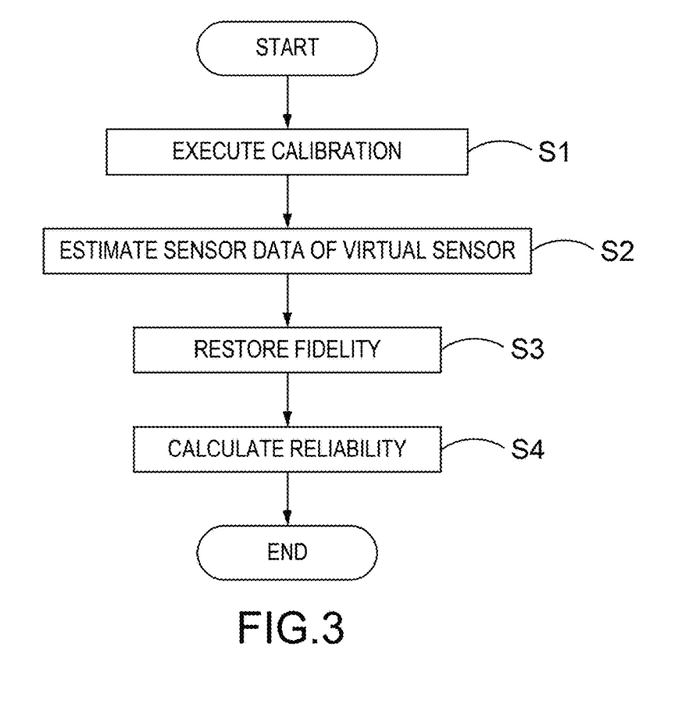
FIG. 3 is a flow chart showing an overall processing operation performed by the characteristic value estimation device of FIG. 1.

FIG. 3 is a flow chart showing an overall processing operation performed by the characteristic value estimation device 1 of FIG. 1. In the characteristic value estimation device 1 of FIG. 1, a calculation model is prepared using an essential law such as a physical or chemical conservation law, and parameters of this calculation model are calibrated using the sensor data of a sensor (Step S1). The calibration at Step S1 is performed by the predictive value calculation unit 9 of FIG. 1. The predictive value calculation unit 9 and probability distribution correction unit 10 also correct the probability distribution of uncertain parameters which are included in the parameters of the calculation model and cannot be calibrated by the sensor data.

Next, the virtual sensor value estimation unit 11 estimates the sensor data of a virtual sensor, based on the error calculated by the predictive value calculation unit 9 (Step S2). Next, the fidelity restoration unit 12 estimates the sensor data of the virtual sensor in which fidelity is restored, based on the error calculated by the predictive value calculation unit 9, the sensor data of the virtual sensor, and the sensor data of the sensor (Step S3). Next, the reliability calculation unit 14 calculates a reliability of the sensor data of the virtual sensor estimated last by the fidelity restoration unit 12 (Step S4).

Figure 4:
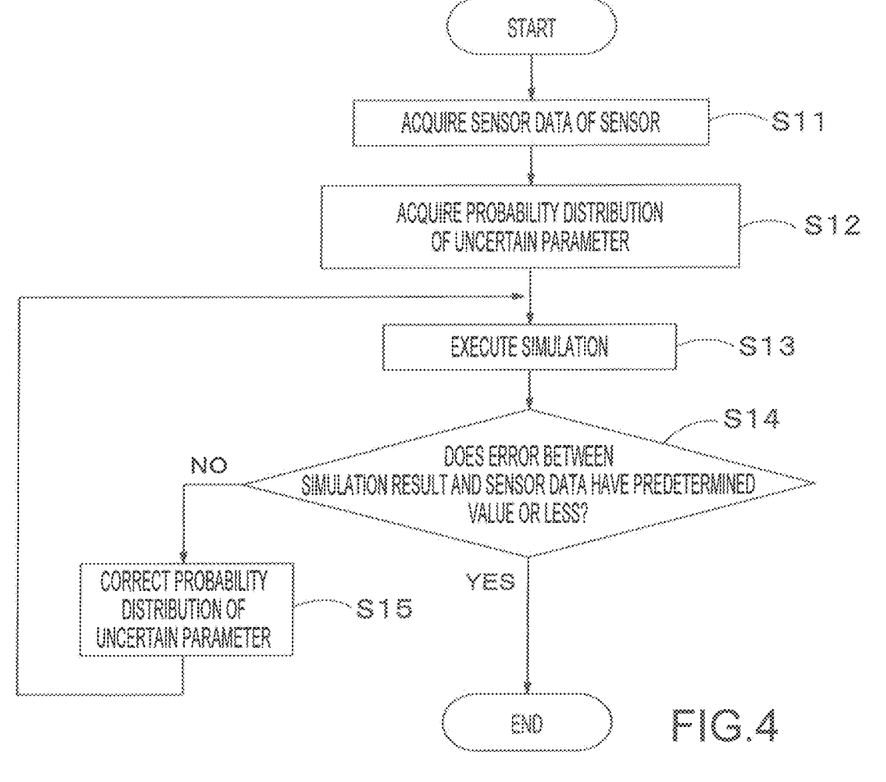
FIG. 4 is a flow chart showing the processing operation of a predictive value calculation unit of FIG. 1.

FIG. 4 is a flow chart showing the processing operation of the predictive value calculation unit 9 of FIG. 1. First, the predictive value calculation unit 9 acquires the sensor data of a sensor inputted into the sensor data input unit (Step S11). Next, the predictive value calculation unit 9 acquires the probability distribution of the uncertain parameter inputted into the probability distribution input unit 4 (Step S12). Next, the predictive value calculation unit 9 executes simulation based on the calculation model by using the sensor data and the probability distribution of the uncertain parameter (Step S13). Next, the predictive value calculation unit 9 compares a simulation result with the sensor data (Step S14). If the error between the simulation result and the sensor data has a predetermined value or less, the process of FIG. 4 is terminated, and if the error is larger than the predetermined value, the predictive value calculation unit 9 corrects the probability distribution of the uncertain parameter (Step S15) and repeats process of Step S13 and subsequent steps.

Next, a concrete example of the present embodiment will be explained. When defining that an observational value is y, a calculation model is $\eta(x, \theta)$, a modeling error is $\delta(x)$, an observational error is $\varepsilon(x)$, and an uncertain parameter in the model is $\theta$, Formula (10) as shown below can be obtained.

$$y(x)=\eta(x,\theta)+\delta(x)+\varepsilon(x) \quad (10)$$

The modeling error $\delta$ corresponds to an error remaining last as a result of the calibration performed on the observational value y using the calculation model $\eta$. The modeling error $\delta$ is generated when the model $\eta$ itself has a gap from the actual process or when there is an unexpected variation factor.

The calibration is a process for estimating, when the model $\eta$ and the observational data $y=(y(x1), \ldots, y(xn))$ are given, the uncertain parameter $\theta$ and the modeling error $\delta(x)$ at the same time to explain the observational data y well.

In the following, explanation will be given on a concrete example where the predictive value calculation unit 9 compares the observational data with the simulation result to correct the uncertain parameter so that the observational data and simulation result match each other.

Based on an assumption that the value of the uncertain parameter has a certain probability distribution, a process for correcting this probability distribution through simulation will be discussed. This correction process will be called calibration. In the calibration, simulation is repeated correcting the prior probability distribution $p(\theta)$ of the uncertain parameter distribution so that the observational data matches the estimation value, to obtain a posterior distribution $p(\theta|y)$ in the end.

In the present embodiment, MCMC (Markov chain Monte Carlo methods) is utilized to obtain the posterior probability distribution. In MCMC, the value of the parameter $\theta$ is randomly selected in accordance with the prior probability distribution, and simulation is repeated while updating the parameter $\theta$ to be selected next based on the comparison between the simulation result and the observational data. Consequently, the posterior probability distribution is obtained by expressing the selection history of the parameter $\theta$ in a histogram.

Figure 5:
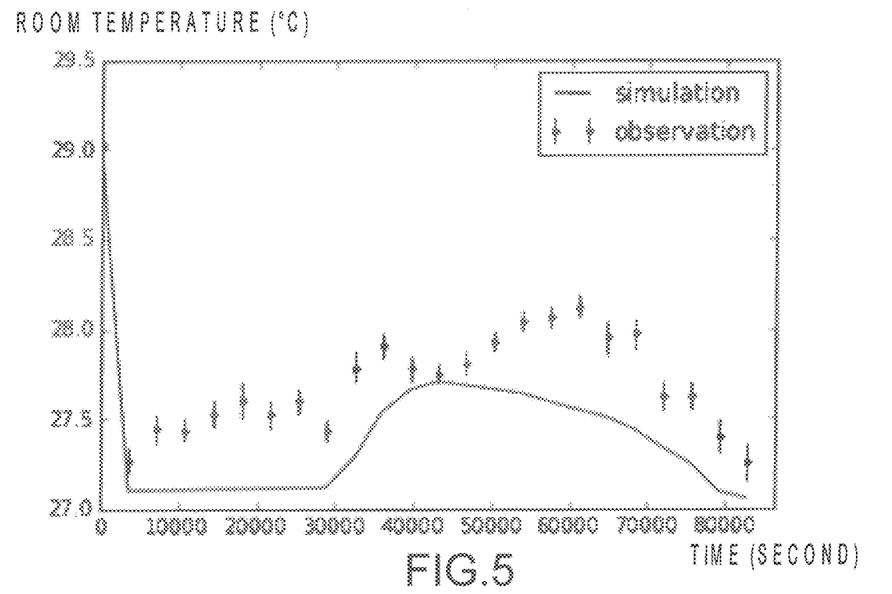
FIG. 5 is a graph showing a simulation result about changes in room temperature per day.

FIG. 5 is a graph showing a simulation result about changes in room temperature per day when setting desired values for the human heat rate pdp (=100) and the set temperature Tsc (=27). In FIG. 5, the horizontal axis represents time, and the vertical axis represents temperature. FIG. 5 shows the observational data y per hour generated by artificially applying noise and model error to the temperature change, together with an error range. As will be understood from FIG. 5, There is a gap between the simulation result and the observational data.

Here, the prior distribution of the human heat rate pdp and set temperature Tsc are in accordance with Gaussian distribution N shown below.

$$p(pdp)=N(\mu=80,\sigma^2=1/0.002) \quad (11)$$

$$p(tsc)=N(\mu=15,\sigma^2=1/0.01) \quad (12)$$

In this Gaussian distribution N, $\mu$ represents an average, $\sigma^2$ represents dispersion, and $T=1/\sigma^2$ is called precision. The Gaussian distribution of one variable x can be expressed by Formula (13) shown below.

[Formula 1]

$$N(x|\mu, \sigma^2) = -\frac{1}{2\sigma^2}\exp\left(-\frac{1}{2\sigma^2}(x-\mu)^2\right) \quad (13)$$

The MCMC used to obtain the posterior probability distribution in the present embodiment is one of algorithms for extracting a sample from multivariate probability distribution. Concretely, when defining that p(A|B) shows the probability of A under condition B, it is known that Formula (14) shown below is established based on Bayes' rule.

$$p(A|B) \text{ to } p(B|A)p(A) \quad (14)$$

Here, when defining that room temperature observed at time x is y, the posterior distribution of the human heat rate pdp and set temperature Tsc when y is observed can be described as in Formula (15) shown below.

$$p(pdp,tsc|y) \text{ to } p(y|x,pdp,tsc)p(pdp)p(tsc) \quad (15)$$

Here, p(y|x, pdp, tsc) can be obtained based on the simulation result and observed room temperature when the human heat rate pdp and set temperature Tsc are given.

In multivariate Gaussian distribution N(y|m, K), m represents a mean function (here, simulation result), and K represents a covariance matrix of the observational error. The probability distribution (i.e., likelihood) with respect to $Kii=\sigma i^2 \delta ij$ can be expressed by Formula (16) shown below.

[Formula 2]

$$p(y|m, K) = (2\pi)^{-D/2}|K|^{-1/2}\exp\left(-\frac{1}{2}(y-m)^T K^{-1}(y-m)\right) \quad (16)$$

In order to obtain m leading to maximum likelihood, log likelihood should be searched. The log likelihood can be expressed by Formula (17) shown below.

[Formula 3]

$$\ln p(y|m, K) = -\frac{1}{2}(y-m)^T K^{-1}(y-m) - \frac{1}{2}\ln|K| - \frac{1}{2}D \times \ln(2\pi) \quad (17)$$

In MCMC, a simulation result when setting the parameters pdp and tsc is used as the median function m, and calculation is repeated while changing the parameters pdp and tsc to make log likelihood larger so that the trajectory of trials on the parameters pdp and tsc consequently reaches the posterior distribution p(pdp, tsc|y).

Figure 6:
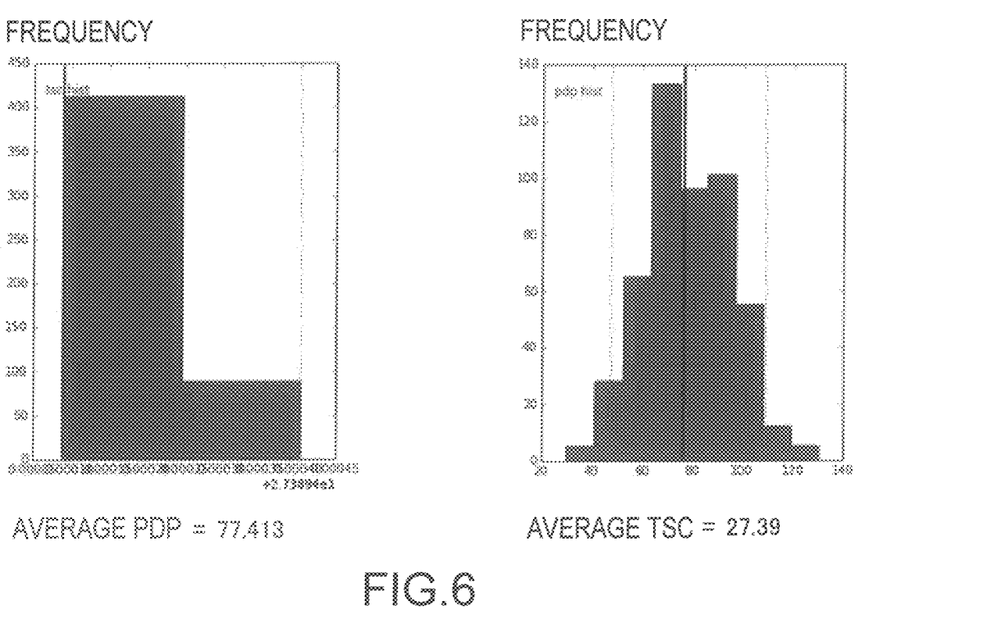
FIG. 6 is a diagram showing an example of a result obtained by performing MCMC.

FIG. 6 is a diagram showing an example of a result obtained by performing MCMC. In the obtained posterior distribution, the average value of the parameter pdp (human heat rate)=77.413, and the average value of the parameter tsc (set temperature)=27.39.

Figure 7:
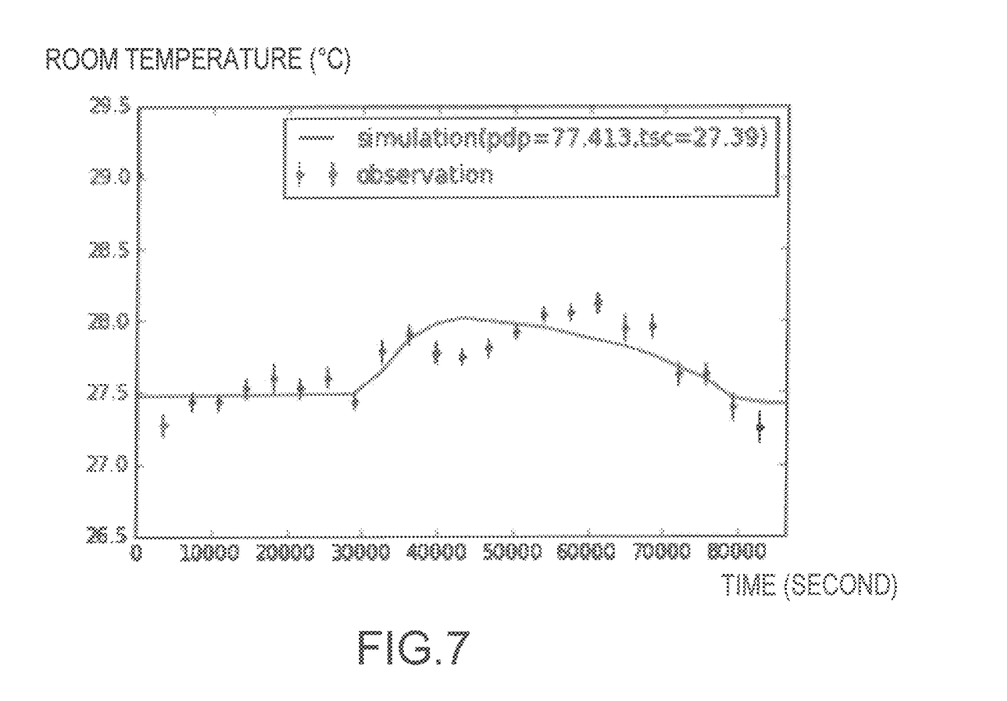
FIG. 7 is a diagram showing observational data and a simulation result of a calculation model when using the average value of posterior distribution.

FIG. 7 is a diagram showing observational data and a simulation result of a calculation model when using the average value of posterior distribution. As shown in FIG. 7, the simulation result and the observational data almost match each other.

Instead of obtaining the posterior distribution of the parameters pdp and tsc by using MCMC, the Gaussian process (Gausian Process) can be used to perform modeling in a continuous value region. The Gaussian process is a probability process in which probability distribution follows multidimensional normal distribution to estimate the probability distribution of a function on which the observational data is based. The Gaussian process is used to estimate spatial distribution and to estimate space-time distribution considering temporal changes. In the field of geospatial information, the Gaussian process has been utilized as a technique (Kriging) for estimating spatial distribution from the data observed at discrete points on a map.

The Gaussian process expresses distribution of a function, which is multivariate Gaussian distribution characterized by a median function m(x) corresponding to a median value and a covariant matrix Kij=k(xi, xj) characterized by a kernel function k/2.

A vector y follows a multivariate Gaussian distribution defined by the median function m and covariant matrix K, which can be expressed in Formula (18) shown below.

$$y \text{ to } N(m, K) \quad (18)$$

Probability distribution based on the multivariate Gaussian distribution with respect to a D-dimensional vector y can be expressed by Formula (19) shown below.

[Formula 4]

$$p(y|m, K) = (2\pi)^{-D/2}|K|^{-1/2}\exp\left(-\frac{1}{2}(y-m)^T K^{-1}(y-m)\right) \quad (19)$$

Here, when defining that an observational value is y, a calculation model is $\eta(x, \theta)$, a modeling error is $\delta(x)$, an observational error is $\varepsilon(x)$, and an uncertain parameter in the model is $\theta$, the above Formula (10) is established.

The model error $\delta(x)$ follows the Gaussian process in Formula (20) shown below.

$$\delta(x) \text{ to } N_\delta(0, K) \quad (20)$$

In order to obtain such uncertain parameter $\theta$ and Gaussian process $\delta(x)$ as making likelihood $p(y|x, \theta, \sigma^2)$ maximum (i.e., a hyperparameter of a kernel function), an algorithm for making the logarithm of likelihood maximum is often used.

Here, when $y(x)-\eta(x, \theta)$ follows the Gaussian process with noise $\varepsilon(x)$, log likelihood can be described as in Formula (21) shown below.

[Formula 5]

$$\ln p(y|x, \theta, \sigma^2) = -\frac{1}{2}r^T K^{-1}r - \frac{1}{2}\ln|K| - \frac{1}{2}D \times \ln(2\pi) \quad (21)$$

In Formula (21), the vector r is a difference vector corresponding to $y(x)-\eta(x, \theta)$ as shown in Formula (22).

[Formula 6]

$$r = \begin{pmatrix} y_1 - \eta(x_1, \theta) \\ y_2 - \eta(x_2, \theta) \\ \ldots \\ y_N - \eta(x_N, \theta) \end{pmatrix} \quad (22)$$

When defining that the kernel function of the original modeling error $\delta(x)$ is k(ti, tj), the covariant matrix K can be expressed by Formula (23) shown below.

$$K_{ij} = \sigma i^2 \delta_{ij} + k(t_i, t_j) \quad (23)$$

Here, $\sigma i^2$ represents dispersion of an observational error $\varepsilon$, and $\delta ij$ represents Kronecker $\delta$. When defining that the kernel function k(ti, tj) is Matern-3/2 kernel, $r=\sqrt{(ti-tj)^2}$, which leads to Formula (24) shown below.

[Formula 7]

$$k(r) = a^2\left(1 + \frac{\sqrt{3}r}{\tau}\right)\exp\left(-\frac{\sqrt{3}r}{\tau}\right) \quad (24)$$

Based on the prior distribution of four parameters a, T, pdp, and tsc, search is performed to make log likelihood maximum considering the calculation model and model error, by which the posterior distribution of these parameters can be obtained.

Figure 8:
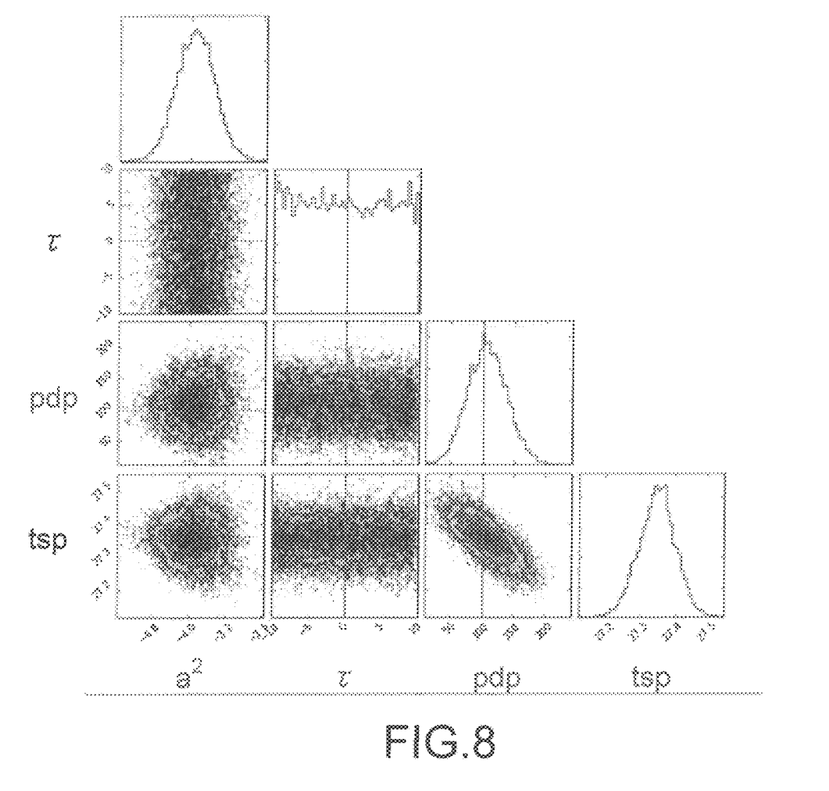
FIG. 8 is a diagram showing posterior distribution obtained by a Gaussian process in a correlation plot format.
Figure 9:
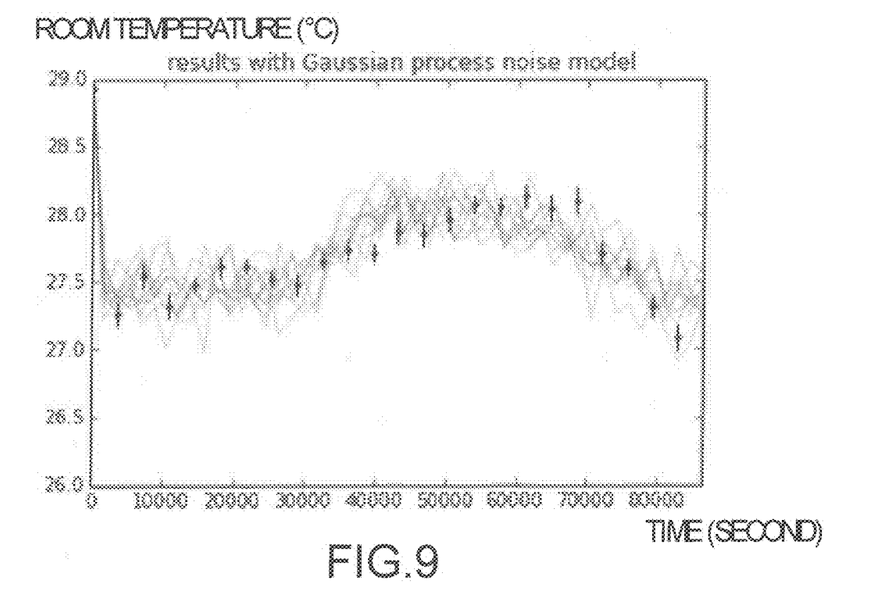
FIG. 9 is diagram plotting a model $\eta(x, \theta)$ together with a sampling result of a function based on obtained Gaussian process $\delta$.

FIG. 8 is a diagram showing posterior distribution obtained by the Gaussian process in a correlation plot format. Further, FIG. 9 is diagram plotting a model $\eta(x, \theta)$ together with a sampling result of a function based on obtained Gaussian process $\delta$.

As stated above, the predictive value calculation unit 9 can estimate the distribution of the uncertain parameter $\theta$ and the modeling error $\delta$ at the same time. In the present embodiment, a specific function (i.e., Matern-3/2 kernel) is employed as the kernel function used in the Gaussian process, but another type of kernel function can be selected.

The obtained posterior distribution is recorded in the probability distribution recording unit 8. The recorded posterior distribution is utilized as prior distribution when new sensor data is obtained. Further, the obtained modeling error δ is recorded in the model error recording unit 13.

The virtual sensor value output unit 16 utilizes an interim result of the evaluation of the calculation model η performed by the predictive value calculation unit 9 to calculate a predictive value, to estimate the physical quantity the sensor does not actually observes or process characteristics which cannot be observed. The virtual sensor value output unit 16 evaluates the definitional formula of the virtual sensor inputted through the virtual sensor information input unit 6, and calculates a desired virtual sensor value.

In the present embodiment, for example, the amount of heat Q accumulated in the room cannot be measured directly, but the value of the parameter Q obtained in the calculation process can be utilized as the virtual sensor value. Further, air conditioning efficiency which can be defined as "amount of inflow heat/electric energy" is a process characteristic which cannot be observed directly, the air conditioning efficiency can be estimated utilizing the result obtained by the predictive value calculation unit 9, which is because the amount of inflow heat is a physical quantity obtained by the predictive value calculation unit 9 when calculating heat balance.

In the present embodiment, the room temperature as the output of the calculation model η is used directly as the output of the virtual sensor value output unit 16.

When such a parameter θ as being capable of explaining the observational data best is obtained, the difference between the observational data y and η(x, θ) becomes the modeling error δ. The modeling error is, in the example of an office, a time-series pattern in which the room temperature rises in the afternoon due to a heat source which is not included in the model, for example. The modeling error may be discretely recorded in the parts having the observational data, or may be continuously recorded. The modeling error δ is recorded in the model error recording unit 13.

For example, when using MCMC, the above predictive value calculation unit 9 in the present embodiment can calculate the modeling error δ only with respect to discrete parts (1 . . . n) which are observed, but when using the Gaussian process, δ modeling error (x) can be continuously calculated as a function.

Spatial granularity is not always fine when obtaining the virtual sensor value estimated by the virtual sensor value output unit 16 based on the predictive value obtained by the predictive value calculation unit 9. The fidelity restoration unit 12 restores spatial precision by interpolating the observational data in which the spatial precision is discretely arranged. For example, the model in the present embodiment is based on an assumption that the room temperature is uniform in one room regarded as one spot. The fidelity restoration unit 12 estimates the temperature distribution of the space based on this estimated room temperature and the values of a small number of temperature sensors arranged in the room.

In the present embodiment, 3D temperature distribution of the entire office is restored based on 14 temperature sensors installed in the office.

Figure 10:
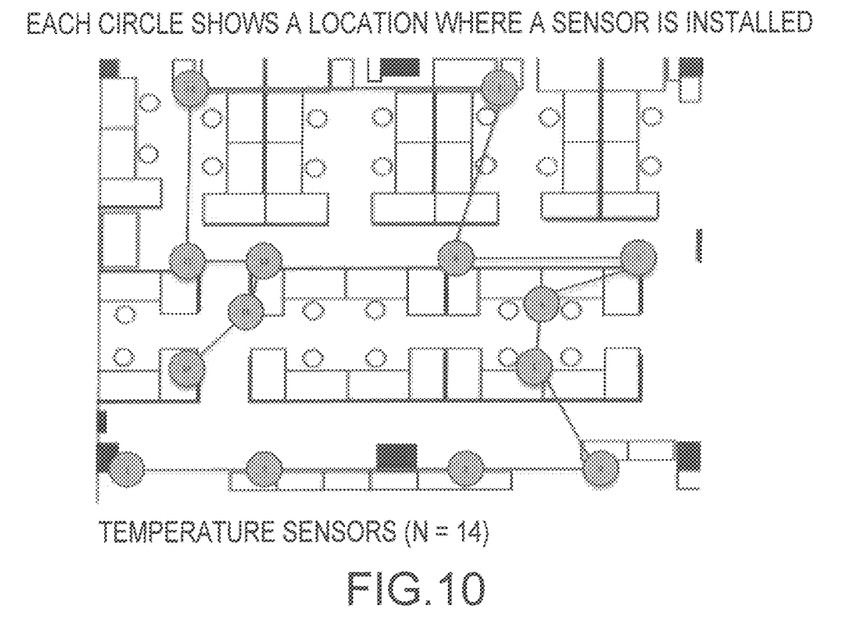
FIG. 10 is a diagram showing the positions of temperature sensors installed in a room two-dimensionally projected on a map.

FIG. 10 is a diagram showing the positions of temperature sensors installed in a room of an office two-dimensionally projected on a map. In the example shown in FIG. 10, totally 14 sensors are provided in the office.

Figure 11:
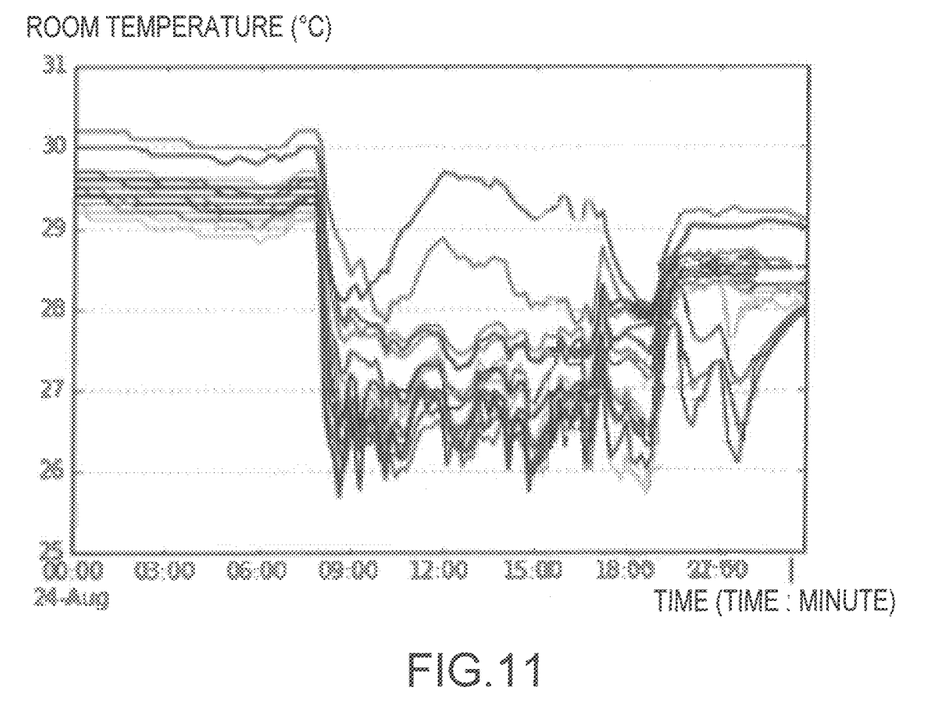
FIG. 11 is a graph plotting temperature changes in a certain day obtained by 14 installed temperature sensors.

FIG. 11 is a graph plotting temperature changes in a certain day obtained by the 14 installed temperature sensors.

The fidelity restoration unit 12 performs regression utilizing the Gaussian process, as fidelity restoration. The Gaussian process is defined as probability distribution on a function y(x), and simultaneous distribution of the value of y(x) with respect to an arbitrary point set x_1, x_2, . . . x_N follows Gaussian distribution.

In the realization of the regression based on the Gaussian process, when defining that N observational data items (x_1, y_1), (x_2, y_2), (x_N, y_N) are obtained, estimated y value at an arbitrary spot x_(N+1) is y_(N+1), the vector of the observational data is y_(N+1)=(y_1, y_n, y_(n+1)), and N(x|μ, Σ) represents multivariate Gaussian distribution in which x follows an average μ and covariance matrix Σ, simultaneous distribution of y_(N+1)=(y_1, . . . , y_n, y_(n+1)) can be expressed by Formula (25) shown below.

$$p(y_{N+1}) = N(y_{N+1}|0, C_{N+1}) \qquad (25)$$

Here, $C_{N+1}$ is a covariance matrix of (N+1)×(N+1), which can be expressed by Formula (26) shown below.

$$c(x_n, x_m) = k(x_n, x_m) + \beta^{-1}\delta_{nm} \qquad (26)$$

k(xn, xm) is called a kernel function expressing the degree of proximity correlation as a function, based on the nature that the value y in proximal x will be also correlative.

Conditional Gaussian distribution can be obtained by dividing this simultaneous distribution, and $C_{N+1}$ can be divided as in Formula (27) shown below.

[Formula 8]

$$C_{N+1} = \begin{pmatrix} C_N & k \\ k^T & t \end{pmatrix} \qquad (27)$$

Here, $k = (k(x_1, x_{N+1}), k(x_2, x_{N+1}), \ldots, k(x_N, x_{N+1}))$, and a scalar value $c = k(x_{N+1}, x_{N+1}) + \beta^{-1}$. Based on division rules of the Gaussian distribution, conditional probability distribution of yN+1 when observational data yN=(y1, . . . , yn) is obtained can be calculated as probability distribution following the Gaussian distribution in Formula (28) shown below.

[Formula 9]

$$p(y_{N+1}|y_N) = N(y_{N+1}|0, C_{N+1}) = N(y_{N+1}|k^T C_N^{-1} y_N, c - k^T C_N^{-1} k) \qquad (28)$$

That is, updating the median function and covariance matrix of the distribution based on the observational data makes it possible to obtain probability distribution of the Gaussian process (i.e. function) consistent with the observational data.

Intuitively, the estimated median function $k_T C_N^{-1}{}_Y$ corresponds to estimating a value by extrapolating a predictive value while using the distance from an existing observation spot to $x_{N+1}$ as a weight.

Figure 12:
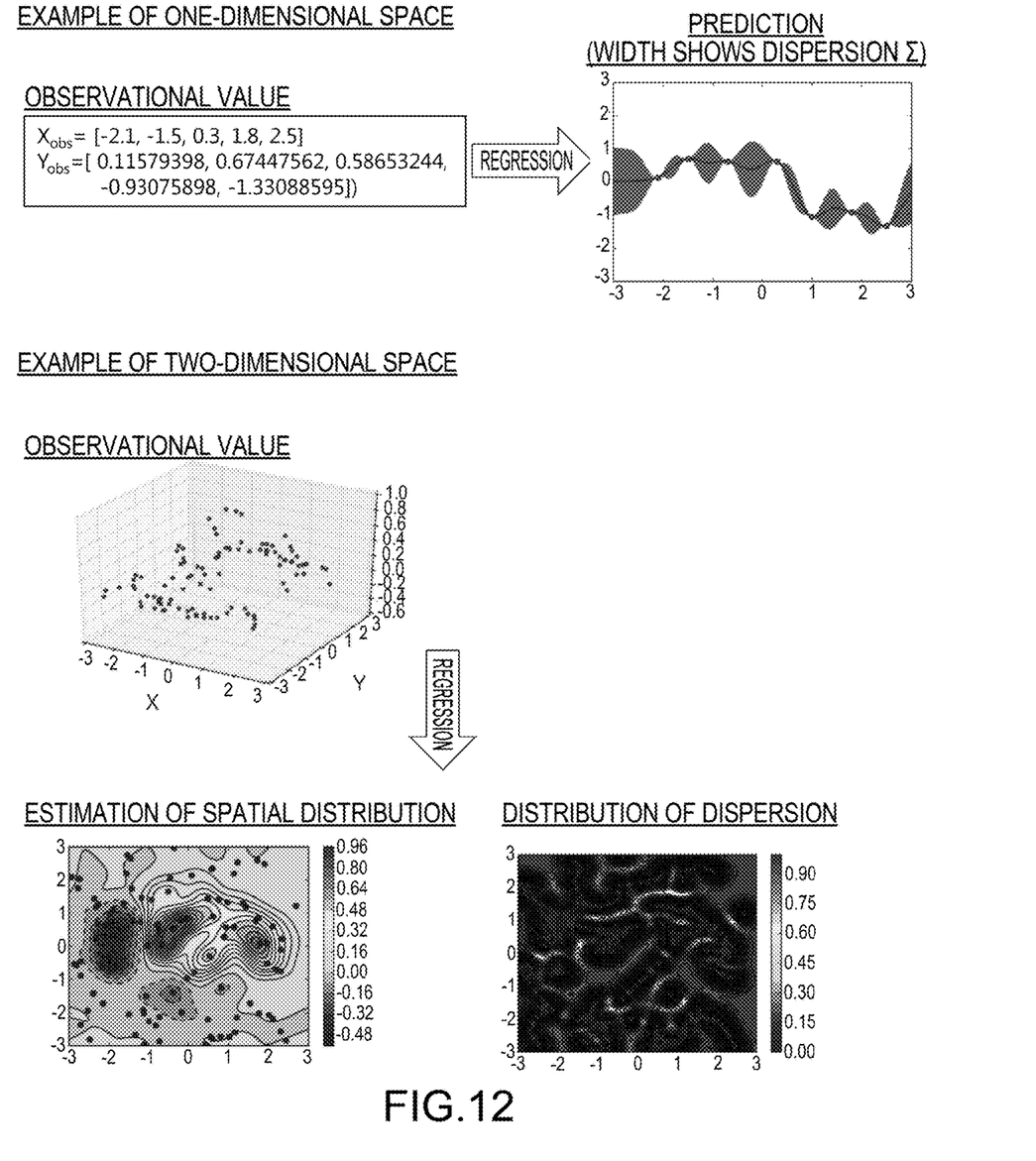
FIG. 12 is a diagram showing an example of Gaussian process regression.

FIG. 12 is a diagram showing an example of the Gaussian process regression. One-dimensional observational data is as shown below.

Xobs=[−2.1,−1.5,0.3,1.8,2.5]

Yobs=[0.11579398, 0.67447562, 0.58653244, −0.93075898, −1.33088595]

The kernel function can be expressed by Formula (29) shown below.

[Formula 10]

$$k(x_n, x_m) = \alpha \exp\left(-\frac{\beta(x_n - x_m)^2}{2}\right) \quad (29)$$

Here, α and β are hyperparameters determining the style of the function for estimation. In the graph, the observation spot and estimation value are plotted as errors.

In the case of two-dimensional observational data, the kernel function with respect to the observational data is similar to the above Formula (29), and two-dimensional distribution is estimated. At this time, the error (i.e., dispersion) is simultaneously estimated.

Hereinafter, explanation will be given on how to restore fidelity utilizing the Gaussian process regression according to the present embodiment. In the Gaussian process regression, changes in the room temperature obtained by the predictive value calculation unit 9 and virtual sensor value estimation unit 11 is used for an average value in the Gaussian distribution.

Figure 13:
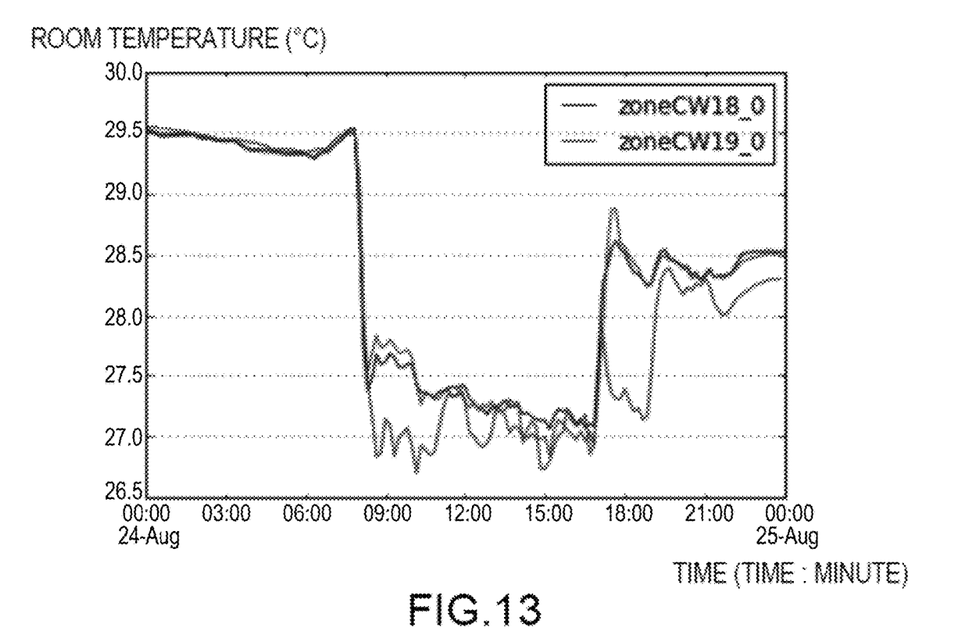
FIG. 13 is a graph plotting temporal transition of temperature estimated for each room.

FIG. 13 is a graph plotting temporal transition of temperature estimated for each room. Regression is performed using a kernel function corresponding to three-dimensional space, while using the room temperature for a mean function. The result of prediction is obtained by calculating the sensor value of a virtual sensor arranged on a three-dimensional grid in the room, and the calculated sensor value is plotted on FIG. 14.

Figure 14:
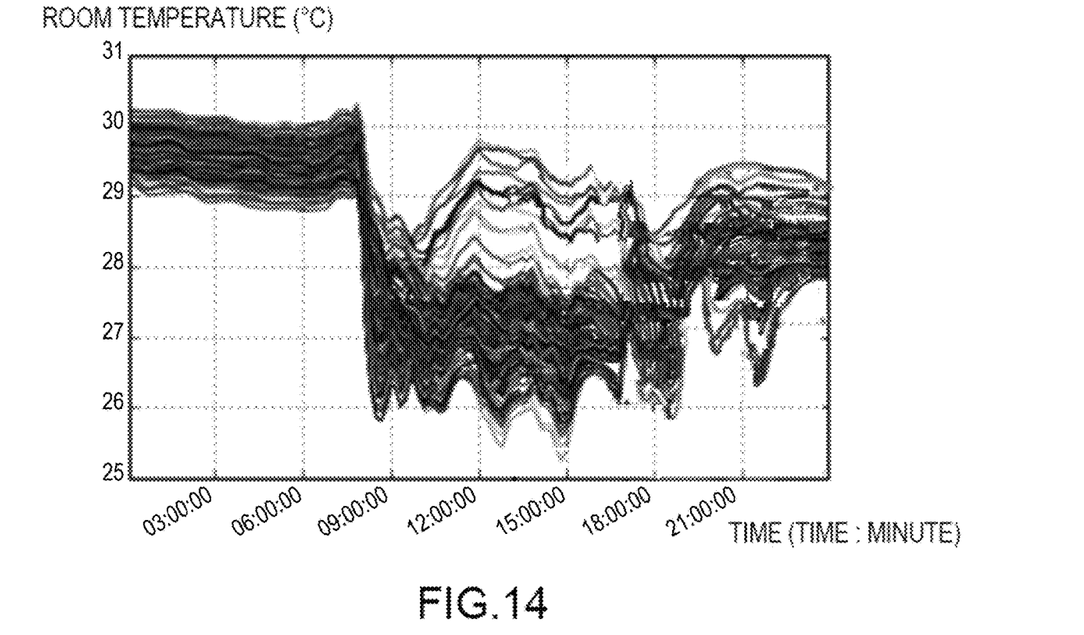
FIG. 14 is a diagram plotting a calculated sensor value of a virtual sensor arranged on a three-dimensional grid in the room.

As shown in FIG. 14, according to the present embodiment, three-dimensional temperature distribution can be restored by regressing the observational data based on the room temperature in each room.

In the example explained above, the predictive value calculation unit 9 in the present embodiment performs calibration utilizing MCMC or Gaussian process, but another means may be used to correct the probability distribution of the uncertain parameter based on the simulation result. For example, parameter prediction using a Kalman filter can be employed.

In this way, in the present embodiment, calibration for correcting the probability distribution of the uncertain parameter is performed, based on the sensor data and the probability distribution of the uncertain parameter, until the simulation result of the calculation model matches the sensor data. Next, desired sensor data of the virtual sensor (virtual sensor value) is estimated based on the error between the simulation result of the calculation model and the sensor data. Next, the estimation value having restored fidelity is calculated with respect to the estimated virtual sensor value, and the reliability of the estimation value is calculated in parallel to that. Thus, according to the present embodiment, the characteristic value in a set region can be estimated with high accuracy by utilizing the sensor data. Further, even when a small number of sensors are provided, characteristic value distribution in the set region can be estimated with high accuracy by utilizing the sensor data of each sensor.

Second Embodiment

Figure 15:
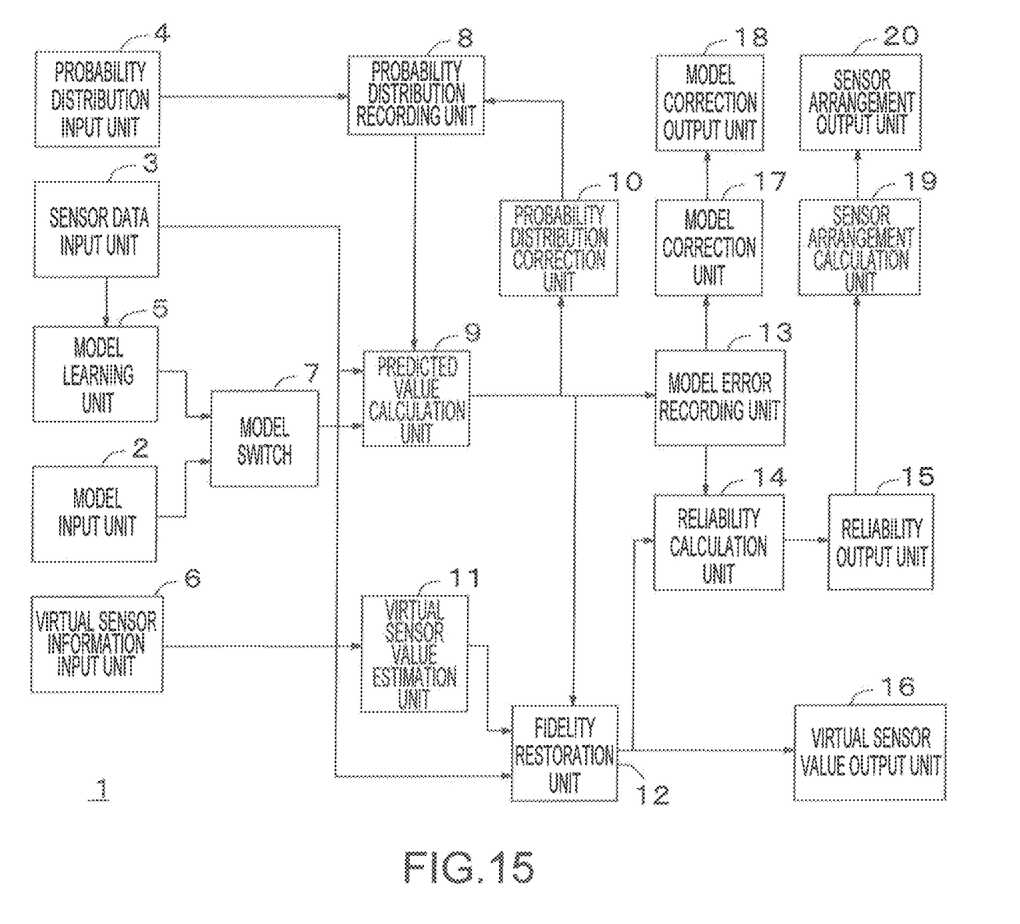
FIG. 15 is a block diagram showing a schematic structure of a characteristic value estimation device 1 according to a second embodiment.

FIG. 15 is a block diagram showing a schematic structure of the characteristic value estimation device 1 according to a second embodiment. In addition to the components of FIG. 1, the characteristic value estimation device 1 of FIG. 15 has a model correction unit 17, a model correction output unit 18, a sensor arrangement calculation unit 19, and a sensor arrangement output unit 20.

The model correction unit 17 corrects the calculation model selected by the model switch 7, based on the error calculated by the predictive value calculation unit 9. As an example, when a model error δ is calculated by the Gaussian process, the model correction unit 17 can create a calculation model from which the model error δ is previously removed as the Gaussian distribution.

The model correction output unit 18 outputs the calculation model corrected by the model correction unit 17, and presents the corrected calculation model to an operator in factory, plant, etc.

The sensor arrangement calculation unit 19 calculates an arrangement plan for the sensors to make the error calculated by the predictive value calculation unit 9 smaller, based on the reliability calculated by the reliability calculation unit 14. That is, the sensor arrangement calculation unit 19 calculates optimum spots for installing the sensors to improve reliability by utilizing the reliability calculated by the reliability calculation unit 14. As an example of realization procedure, the sensor arrangement calculation unit 19 specifies a location having the lowest reliability and install an addition sensor there.

The sensor arrangement output unit 20 outputs the sensor arrangement plan calculated by the sensor arrangement calculation unit 19, and presents this sensor arrangement plan to an operator in factory, plant, etc.

In this way, in the second embodiment, the prediction accuracy of the characteristic value can be improved by adding a small number of sensors. Further, the error can be made small by correcting the calculation model based on the error calculated by the predictive value calculation unit 9.

At least a part of the characteristic value estimation device explained in the above embodiment may be formed of hardware or software. In the case of software, a program realizing at least a partial function of the characteristic value estimation device may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, memory, etc.

Further, a program realizing at least a partial function of the characteristic value estimation device can be distributed through a communication line (including radio communication) such as the Internet. Furthermore, this program may be encrypted, modulated, and compressed to be distributed through a wired line or a radio link such as the Internet or through a recording medium storing it therein.

While certain embodiments have been described, these embodiments have been presented by way of example only, and are not intended to limit the scope of the inventions. Indeed, the novel methods and systems described herein may be embodied in
a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A characteristic value estimation device comprising:
a sensor data input unit to input sensor data detected by one or more sensors monitoring a characteristic value;

a model input unit to input a first calculation model which calculates the characteristic value;

a model learning unit to perform learning on a second calculation model which calculates the characteristic value, based on the sensor data;

a model switch to select any one of the first calculation model and the second calculation model;

a predictive value calculation unit to calculate an error of the calculation model by comparing a value obtained by executing a simulation which calculates the characteristic value with the sensor data of the one or more sensors, based on the calculation model selected by the model switch, a probability distribution of an uncertain parameter in a plurality of parameters included in the calculation model, and the sensor data of the one or more sensors;

a probability distribution correction unit to correct the probability distribution of the uncertain parameter until the error has a predetermined value or less;

a virtual sensor value estimation unit to estimate sensor data of a virtual sensor arranged virtually at a location where the one or more sensors is not arranged, based on the error;

a characteristic value distribution estimation unit to estimate a distribution of the characteristic value at the location where the one or more sensors is not arranged, based on the error, the sensor data of the virtual sensor, and the sensor data of the one or more sensors;

a reliability calculation unit to calculate a reliability of the characteristic value distribution estimated by the characteristic value distribution estimation unit;

a sensor arrangement calculation unit to calculate an arrangement plan for the one or more sensors to make the error smaller, based on the reliability;

a probability distribution input unit to input the probability distribution of the uncertain parameter as a prior distribution; and a probability distribution recording unit to record the probability distribution of the uncertain parameter corrected by the probability distribution correction unit, as a posterior distribution;

wherein the characteristic value distribution estimation unit interpolates discretely-arranged physical sensor data of the one or more sensors to estimate the data of the virtual sensor arranged at the location where the sensor one or more sensors is not arranged; and the reliability calculation unit calculates the reliability of the sensor data of the virtual sensor estimated by the characteristic value distribution estimation unit;

wherein the predictive value calculation unit executes the simulation using, as a prior distribution, the probability distribution of the uncertain parameter inputted into the probability distribution input unit until the probability distribution correction unit corrects the probability distribution of the uncertain parameter, and executes the simulation using, as a prior distribution, the probability distribution recorded in the probability distribution recording unit when being inputted with new sensor data from the sensor data input unit after the probability distribution correction unit corrects the probability distribution of the uncertain parameter.

2. The characteristic value estimation device of claim 1, further comprising:

a sensor arrangement output unit to output information on the calculated arrangement plan;

a model correction unit to correct the calculation model selected by the model switch, based on the error; and a model correction output unit to output information on the corrected calculation model.

3. The characteristic value estimation device of claim 1, wherein the characteristic value distribution estimation unit performs regression utilizing a Gaussian process to estimate the sensor data of the virtual sensor arranged at the location where the one or more sensors is not arranged.

4. The characteristic value estimation device of claim 1, wherein the model switch adjusts a granularity which divides a space to select a calculation model having a predetermined granularity.

5. The characteristic value estimation device of claim 1, wherein:

the characteristic value is a temperature; and
the uncertain parameter includes a human heat rate and a set temperature.

6. The characteristic value estimation device of claim 5, wherein:

the one or more sensors is a temperature sensor; and
the characteristic value distribution estimation unit estimates a temperature distribution at narrower intervals than an interval of the temperature sensor.

7. A characteristic value estimation method comprising:

inputting sensor data detected by one or more sensors monitoring a characteristic value;

inputting a first calculation model which calculates the characteristic value;

performing learning on a second calculation model which calculates the characteristic value, based on the sensor data;

selecting any one of the first calculation model and the second calculation model;

calculating an error of the calculation model by comparing a value obtained by executing a simulation which calculates the characteristic value with the sensor data of the one or more sensors, based on the selected calculation model, a probability distribution of an uncertain parameter in a plurality of parameters included in the calculation model, and the sensor data of the one or more sensors;

correcting the probability distribution of the uncertain parameter until the error has a predetermined value or less;

estimating sensor data of a virtual sensor arranged virtually at a location where the one or more sensors is not arranged, based on the error;

estimating a distribution of the characteristic value at the location where the one or more sensors is not arranged, based on the error, the sensor data of the virtual sensor, and the sensor data of the one or more sensors;

calculating a reliability of the estimated distribution of the characteristic value;

calculating an arrangement plan for the one or more sensors to make the error smaller, based on the reliability;

interpolating discretely-arranged physical sensor data of the one or more sensors to estimate the sensor data of the virtual sensor arranged at the location where the one or more sensors is not arranged; and calculating the reliability of the sensor data of the estimated virtual sensor, inputting the probability distribution of the uncertain parameter as a prior distribution; and recording the probability distribution of the corrected uncertain parameter, as a posterior distribution;

wherein:

the simulation is executed by using the inputted probability distribution of the uncertain parameter as a prior distribution, until the probability distribution of the uncertain parameter is corrected; and the simulation is executed by using the recorded probability distribution as a prior distribution, when new sensor data is inputted after the probability distribution of the uncertain parameter is corrected.

8. The method of claim 7, further comprising:

outputting information on the calculated arrangement plan;

correcting the selected calculation model based on the error; and outputting information on the corrected calculation model.

9. The method of claim 7,
wherein regression utilizing a Gaussian process is performed to estimate the sensor data of the virtual sensor arranged at the location where the one or more sensors is not arranged.

10. The method of claim 7,
wherein granularity which divides a space is adjusted to select a calculation model having a predetermined granularity.

11. The method of claim 7, wherein:
the characteristic value is a temperature; and
the uncertain parameter includes a human heat rate and a set temperature.

12. The method of claim 11, wherein:
the sensor is a temperature sensor; and
a temperature distribution is estimated at narrower intervals than an interval of the temperature sensor.

* * * * *

UNITED STATES PATENT AND TRADEMARK OFFICE
CERTIFICATE OF CORRECTION

PATENT NO. : 11,132,616 B2  
APPLICATION NO. : 15/462784  
DATED : September 28, 2021  
INVENTOR(S) : Mikito Iwamasa et al.

Page 1 of 1

It is certified that error appears in the above-identified patent and that said Letters Patent is hereby corrected as shown below:

In the Claims

Claim 1, Column 15, Line 44, "to estimate the data" should read --to estimate the sensor data--.

Claim 1, Column 15, Line 46, "sensor one or more sensors" should read --one or more sensors--.

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*